Jan. 16, 1962 K. P. RYAN 3,016,879
CATTLE TREATING DEVICE
Filed Jan. 23, 1959 2 Sheets-Sheet 1
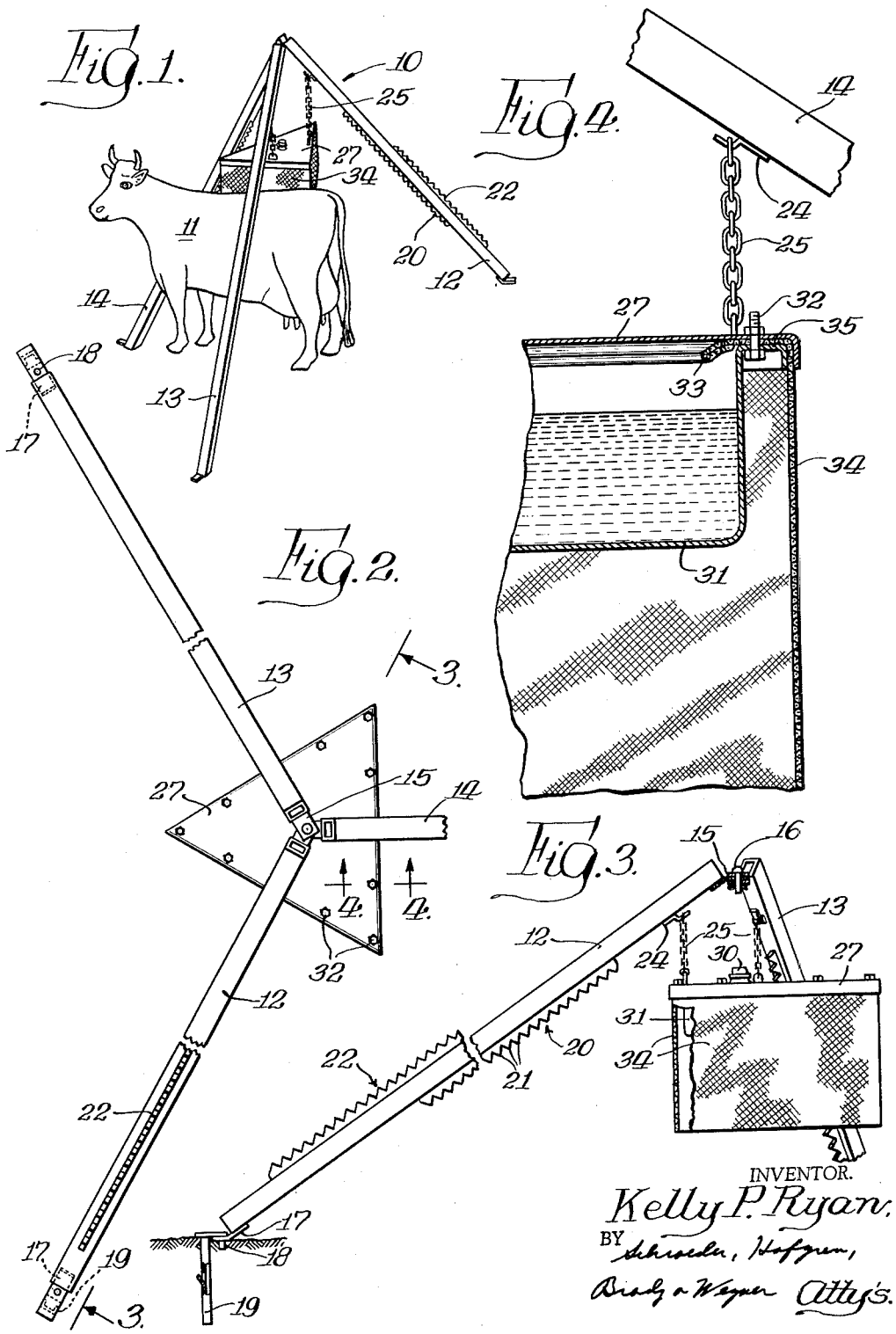
INVENTOR.
Kelly P. Ryan.

Jan. 16, 1962  K. P. RYAN  3,016,879
CATTLE TREATING DEVICE
Filed Jan. 23, 1959  2 Sheets-Sheet 2
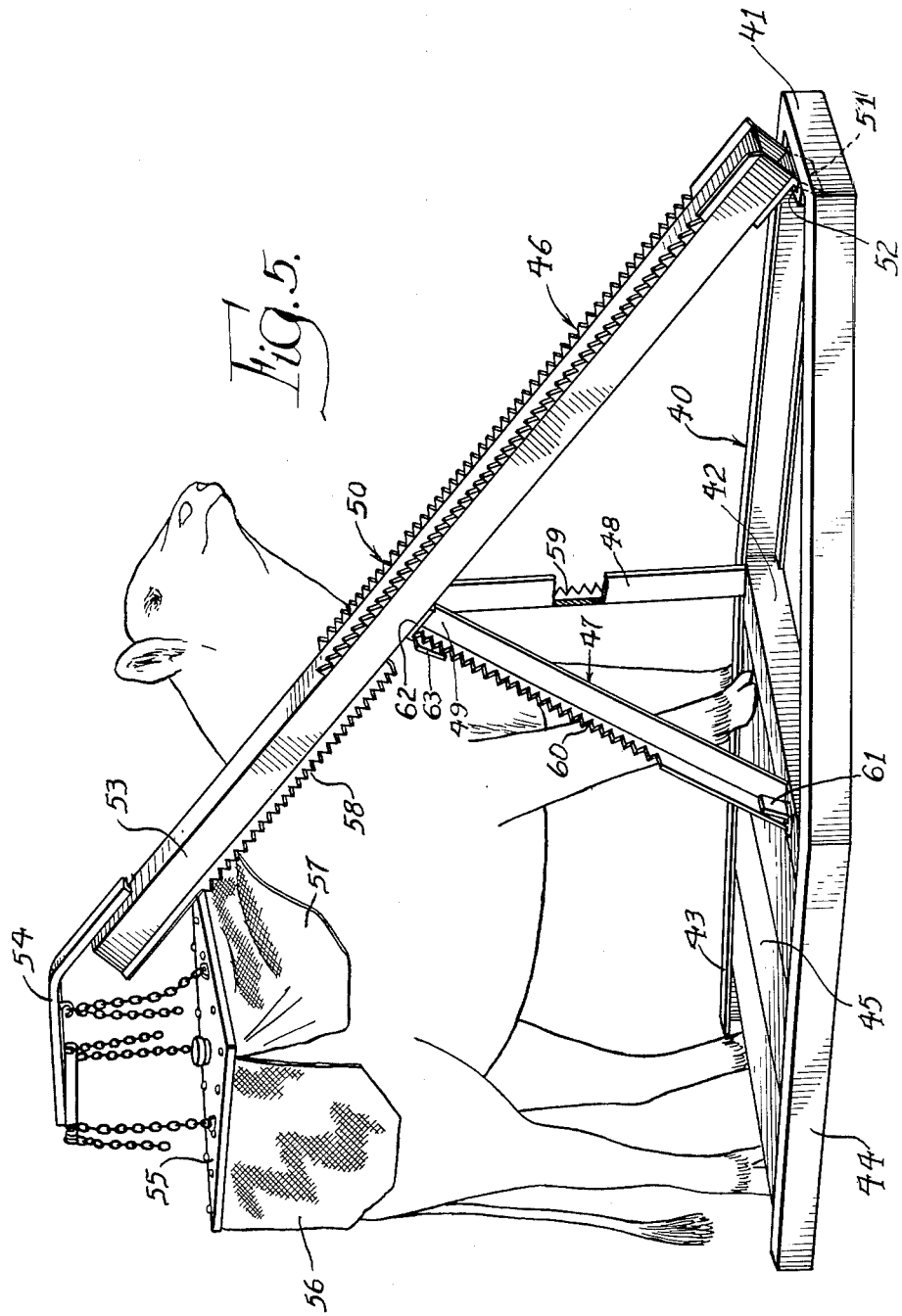
INVENTOR.
Kelly P. Ryan,
BY Hofgren, Brady, Wegner,
Allen and Stellman,
Attys.

United States Patent Office 3,016,879
Patented Jan. 16, 1962

3,016,879
CATTLE TREATING DEVICE
Kelly P. Ryan, Blair, Nebr., assignor to Blair Manufacturing Co., Inc., a corporation of Nebraska
Filed Jan. 23, 1959, Ser. No. 788,699
11 Claims. (Cl. 119—157)

This invention relates to a cattle treating device and more particularly to a device which may be utilized for the self-currying and oiling of cattle.

It is the general object of the present invention to produce a new and improved device of the character described.

It is a further object of the invention to produce a cattle treating device usable to provide a self-currying and self-oiling apparatus suitable for use in areas where cattle are maintained.

This application is a continuation-in-part of my co-pending application Serial No. 684,715 filed September 18, 1957 now abandoned.

The habit of cattle of scratching themselves by rubbing against an object is well recognized, and it is not unusual to find many trees in pasture lands rubbed smooth in areas where cattle have repeatedly rubbed thereagainst. While such self-scratching by the cattle may be of little concern in pasture areas it becomes of concern in situations where cattle are maintained in a relatively confined area where trees may be lacking. In such situations, cattle normally rub against the surrounding fence posts and often do extensive damage to fences by such behavior. The situation may become particularly acute in cattle feed yards where the cattle are fed a highly enriched diet in order to prepare them for market. Such diets often produce skin irritations on the cattle with the result that the rubbing is intensified so that damage is often caused to the surrounding enclosures.

According to the present invention there is provided a simple, yet sturdy device which not only is particularly adapted to permit cattle to scratch themselves thereon (and by such adaptability tends to keep the cattle away from the surrounding fences), but also provides means for applying oil to the hide of the cattle during the scratching operation which oil may be selected from the type adapted to improve the cattle hide and to relieve itching.

Thus, it is yet another object of the invention to produce a simple yet sturdy cattle treating device which is effective to provide suitable areas where cattle may relieve the irritation of itching and which will simultaneously apply oil to the hide of the cattle, further to relieve such itching.

Other and further objects and advantages of the present invention will be readily apparent from the following description and drawings, in which:

FIG. 1 is a side elevational view showing the cattle treating device of the present invention in use;

FIG. 2 is an enlarged top plan view of the apparatus shown in FIG. 1;

FIG. 3 is a side elevational view broken and in section of the apparatus of FIG. 2 taken generally along line 3—3 thereof;

FIG. 4 is an enlarged fragmentary sectional view taken along line 4—4 of FIG. 2; and FIG. 5 is an elevational view of a modified form of the apparatus.

While this invention is susceptible of embodiments in many different forms, there is shown in the drawings and will herein be described in detail a plurality of embodiments, with the understanding that the present disclosure is to be considered as an exemplification of the principles of the invention and is not intended to limit the invention to the embodiments illustrated. The scope of the invention will be pointed out in the appended claims.

The cattle curry and oiler of the present invention is in the form of a tripod 10 having a height sufficient to permit cattle, such as the cow 11, to stand therebeneath. The tripod is made up of three legs 12, 13 and 14, each provided at its top with a bracket 15 having a suitable hole through which a bolt 16 extends. The foot of each leg of the tripod is also provided with a bracket 17 having a suitable hole therein to receive the pin 18 secured to a stake 19. With a stake 19 driven into the ground adjacent the lower end of each leg and with the pin 18 engaging the hole in the bracket 17, the tripod is firmly anchored in position, so that cattle rubbing against the legs will not upset or otherwise collapse the assembly.

Secured to the underside of each of the legs of the tripod and extending therealong is an elongated currying device 20 provided with a plurality of teeth 21 and positioned to contact the hide of cattle standing beneath the tripod. A further currying device 22 may be secured to the upper side of one of the legs, such as the leg 14, in order that the cattle may scratch the underside of their bodies.

For the purpose of oiling the cattle an oiling device is suspended from the apex of the tripod and positioned so as to automatically apply oil to the hides of cattle standing beneath the tripod. For this purpose a bracket 24 is secured to the underside of each of the legs of the tripod and near the apex thereof from which chains 25 are suspended. A three-sided reservoir is suspended from the chains which reservoir is triangular in plan and provided with a triangular top 27. A fill cap 30 is provided in the top 27 so that oil may be introduced into the reservoir to partially fill a pan 31 secured by bolts 32 to the top 27. The bolts 32 also serve as a means of regulating the flow of oil in the manner hereafter described.

As previously noted, the pan 31 is not completely filled with oil but the level therein is maintained below the inner ends 33 of three oiling pads 34, each hanging downwardly as shown. As will be noted from an inspection of FIG. 4, a portion of the oiling pads extends between the top 27 and the upper lip 35 of the pan 31, so that as the nuts are tightened on the bolts 32, that portion of the oiling pads is compressed between the top 27 and the lip 35.

Cattle standing beneath the tripod 10 and rubbing one side against the adjacent currying device 20 will have their opposite side in contact with one of the oiling pads 34 which hang down substantially normal to the adjacent extending leg of the tripod. Movement of the cattle while scratching themselves serves to jostle the reservoir and cause the oil in the pan to splash upwardly and moisten the ends 33 of the oiling pads. As the pads are made of absorbent material the oil is carried by capillary action into that portion of the pad outside of the reservoir and against which the cattle rub. The degree of tightening of the nuts on the bolts 32 serves to regulate the flow of oil from the portion within the reservoir to the portion of the pads outside the reservoir, and with the ends 33 positioned above the normal level of oil in the pan 31, oil is delivered to the oiling pads only when necessary, i.e., when cattle are actually present beneath the tripod.

Referring now to the embodiment of the invention shown in FIG. 5, there is provided a frame 40 generally in the shape of the letter A, having an apex at 41, a cross-frame member 42 and two outer portions of the A, 43 and 44, between which, and the crossframe member, is secured a planked platform member 45.

The tripod of the device generally designated 46 comprises a pair of legs 47 and 48 secured together in the form of an inverted V, attached at its apex 49 to an intermediate portion of the third leg 50 of the tripod. The third leg 50 is provided at its lower end with a tongue 51 received in a slot 52 provided in the apex 41 of the A-frame and extends upwardly beyond the point of attachment of the apex 49 to have an upper portion 53 extending above the tripod 46. An arm 54 secured to the upper end of the leg 50 carries a generally triangular reservoir 55 substantially identical to the reservoir previously described and, like the former reservoir, is provided with three oiling pads, two of which 56 and 57 are shown.

A currying device 58 is secured to the underside of the upper portion 53 of leg 50 and similar currying devices 59 and 60 are secured to the legs 47 and 48 and extend outwardly therefrom as shown.

It will be apparent from the foregoing description that the apparatus of FIG. 5 may be assembled without the necessity of ground posts such as the posts 19 in the previous embodiment, and may be assembled simply by laying the A-frame on the ground, orienting the lower ends of the legs 47 and 48 so as to engage with lugs 61 provided on the crossframe member 42. Clearly, the lugs 61 could be secured to the lower ends of the legs 47 and 48 and be positioned to engage suitable slots or the like provided in the crossframe member 42. By engaging the tongue 51 in the slot 52 and elevating the third leg 50, the apex 49 of the two other legs can be placed against the plate 62 on the leg 50 just beneath a second plate 63 (also secured to the leg 50) so that the two legs 47 and 48 hold the third leg 50 in the illustrated position and are locked in this position by plates 62 and 63. It is then merely necessary to suspend the reservoir 55 by means of the illustrated chains and hooks.

While it will be clear that the cattle curry and oiling device of the present invention is relatively simple in construction, it will be appreciated that the device can be readily assembled and securely anchored in any desired location and when so positioned provides means whereby cattle not only may relieve any discomfort due to skin irritation but are simultaneously treated for such irritation in a manner and by means of apparatus which conserves the treating material.

I claim:

1. A cattle curry comprising a tripod having at least one leg extending to a height sufficient to permit cattle to stand therebeneath, an elongated currying device secured to and extending along the underside of said leg, means operatively associated with each of the legs of the tripod for securing the lower ends of the legs against movement, an oil reservoir generally triangular in plan flexibly suspended from near the top of said one leg and having oil therein, three oiling pads suspended from the reservoir, one arranged to hang down each of the sides thereof in substantially vertical planes and positioned to contact cattle rubbing against said curring device, the top edges of said oiling pads being located above the surface of said oil to contact the oil only when said reservoir is jostled by cattle rubbing against the currying device.

2. A cattle curry comprising a tripod having two legs of substantially equal length and a third leg having a length approximately double that of the first two legs, said first two legs being arranged in an inverted V secured at its apex to an intermediate portion of said third leg, said third leg having an upper portion extending beyond said apex, an elongated currying device secured to and extending along the underside of said upper portion of the third leg, an oil reservoir flexibly suspended from the upper end of said third leg and having oil therein, and an oiling pad suspended from the reservoir and positioned to contact cattle rubbing against said currying device, the top edges of said pad being located above the surface of said oil to contact the oil only when said reservoir is jostled by cattle rubbing against said currying device.

3. A cattle curry comprising a tripod having a height sufficient to permit cattle to stand therebeneath, an elongated currying device secured to and extending along the underside of each of the legs of the tripod, means operatively associated with each of the legs for securing the ends of the legs against movement, a generally triangular oil reservoir suspended from the apex of the tripod, three oiling pads suspended from the reservoir, one arranged to hang down each of the sides thereof in a plane substantially perpendicular to the adjacent leg of the tripod and positioned to contact cattle rubbing against the currying device on said adjacent leg.

4. A cattle curry comprising a tripod having a height sufficient to permit cattle to stand therebeneath, an elongated currying device secured to and extending along the underside of each of the legs of the tripod, means for securing the ends of the legs against movement, a generally triangular oil reservoir suspended from the apex of the tripod, three oiling pads suspended from the reservoir, one arranged to hang down each of the sides thereof in a plane substantially perpendicular to the adjacent leg of the tripod and positioned to contact cattle rubbing against the currying device on said adjacent leg, each of said pads being arranged to receive oil from the reservoir, and means operatively associated with the reservoir to control the flow of oil therefrom into said pads.

5. A cattle curry comprising a frame generally in the form of the letter A, a pair of legs secured together in the form of a V, a third leg attached at one end to the top of the A-frame and secured at a point intermediate its length to the apex of said V, means for securing the outer ends of said V to the crossframe member of said A-frame, a currying device secured to the underside of said third leg along the portion thereof intermediate the upper end of said leg and the point of attachment of said apex thereto, an oil reservoir flexibly suspended from the upper end of said third leg and being partially filled with oil, and an oiling pad having an upper edge within said reservoir, positioned above said oil, said pad suspended from the reservoir and positioned to contact cattle rubbing against said currying device, said oil contacting said upper edge to saturate said oiling pad only when the reservoir is jostled by cattle rubbing against said currying device.

6. The cattle curry of claim 5 including a platform secured to said crossframe member and the outer portions of said A-frame.

7. The curry device of claim 5 including means on said A-frame for detachably mounting said legs thereon.

8. The curry device of claim 5 including a currying device secured to the upper surface of said third leg along the lower portion thereof and including currying devices secured to the outwardly facing sides of each of said pair of legs.

9. A cattle curry comprising a tripod having at least one leg extending to a height sufficient to permit cattle to stand therebeneath, an elongated currying device secured to and extending along the underside of said one leg, means for securing the lower ends of the legs of the tripod against movement, an oil reservoir generally triangular in plan flexibly suspended from near the top of said one leg and having oil therein, a plurality of oiling pads suspended from the reservoir, arranged to hang down the sides of said reservoir in substantially vertical planes and positioned to contact cattle rubbing against the currying device, the top edges of said oiling pads being located above the surface of said oil to contact the oil and saturate the pads only when said reservoir is jostled by cattle rubbing against the currying device, and means operatively associated with the reservoir to control the flow of oil therefrom into said pads.

10. A cattle curry comprising a tripod having at least one leg extending to a height sufficient to permit cattle to stand therebeneath, a currying device including a series of teeth secured to and extending along the underside of said one leg, means for securing the lower ends of the legs of the tripod against movement, an oil reservoir having a top affixed thereto, flexibly suspended from the upper end of said one leg and being partially filled with oil, at least one oiling pad having a top portion thereof secured between the top and sides of said reservoir in a manner to position the edge thereof inside said reservoir and above said oil, the remainder of said pad hanging downward along the sides of said reservoir in a substantially vertical plane to contact cattle rubbing against the currying device on said one leg, said pad being arranged to receive oil from said reservoir when the upper edge of said pad comes in contact with said oil, means for placing the upper edge of the pad in contact with the oil, and means operably associated with the reservoir to control the flow of oil therefrom into the pads.

11. A cattle curry comprising a tripod having two legs of substantially equal length and a third leg having a length approximately double that of the first two legs, said first two legs being arranged in an inverted V secured at its apex to an intermediate portion of said third leg, said third leg having an upper portion extending beyond said apex, an elongated currying device secured to and extending along the underside of said upper portion of the third leg, an oil reservoir secured to the upper end of said third leg and having oil therein, an oiling pad of absorbent material having one end positioned to contact oil in the reservoir, said oiling pad being adapted to convey by capillary attraction oil from the reservoir to saturate the pad, said oiling pad being supported by said third leg and positioned to contact cattle rubbing against said currying device.

References Cited in the file of this patent

UNITED STATES PATENTS

| | | |
|---|---|---|
| 987,433 | Crawford | Mar. 21, 1911 |
| 1,146,069 | Hayne | July 13, 1915 |
| 1,999,122 | Clark et al. | Apr. 23, 1935 |
| 2,768,608 | Anderson | Oct. 30, 1956 |

FOREIGN PATENTS

| | | |
|---|---|---|
| 224,007 | Great Britain | Nov. 6, 1924 |